K. S. CHUNG.
GAME APPARATUS.
APPLICATION FILED FEB. 10, 1919.
1,305,341.
Patented June 3, 1919.
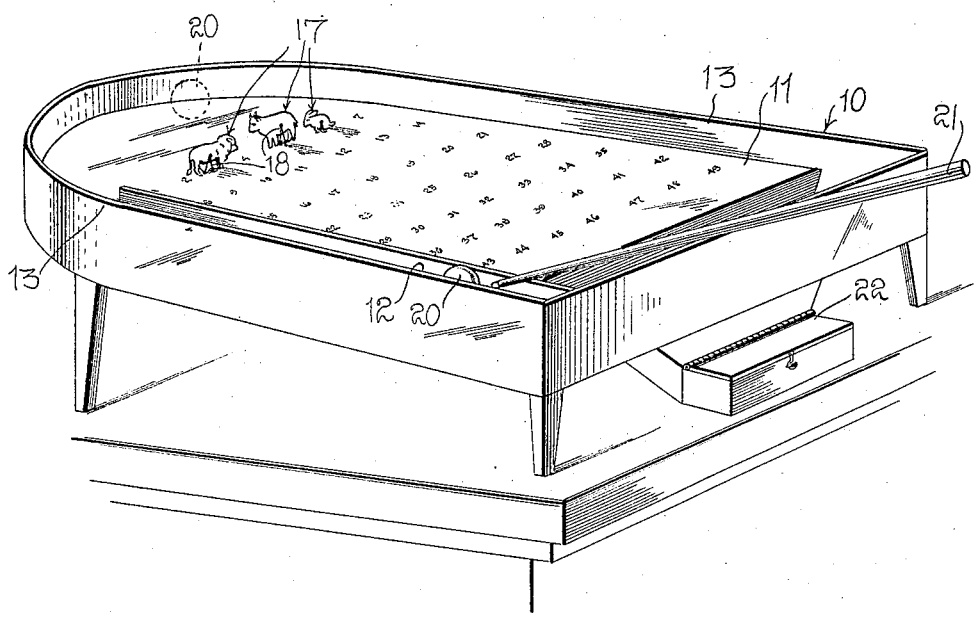
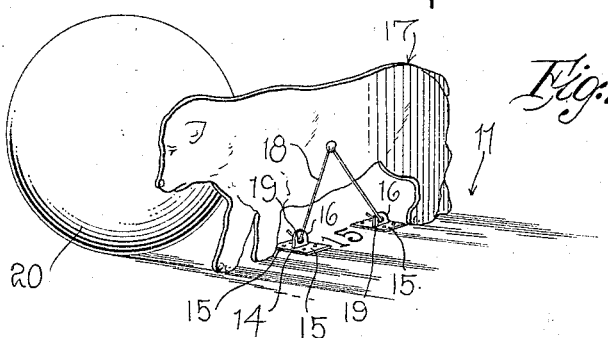
Inventor
Kun Sung Chung
By Watson E. Coleman
Attorney

UNITED STATES PATENT OFFICE.

KUN SUNG CHUNG, OF HONOLULU, TERRITORY OF HAWAII.

GAME APPARATUS.

1,305,341.   Specification of Letters Patent.   Patented June 3, 1919.

Application filed February 10, 1919.  Serial No. 276,114.

*To all whom it may concern:*

Be it known that I, KUN SUNG CHUNG, a citizen of the United States, residing at Honolulu, in the city and county of Honolulu and Territory of Hawaii, have invented certain new and useful Improvements in Game Apparatus, of which the following is a specification, reference being had to the accompanying drawings.

This invention relates to toys and games, and particularly to a toy or game comprising a board representing a hunting field and having thereon small figures representing animals of various species, the animals being so mounted that they may be knocked over by a marble or other piece and the board being provided with means whereby the marble or other piece may be projected onto the board to knock over as many animals as possible.

Other objects have to do with the particular means for mounting the animals so that they may be readily placed on the board and readily knocked over by the marble.

My invention is illustrated in the accompanying drawings, wherein:—

Figure 1 is a perspective view of a game board constructed in accordance with my invention with a few of the animal pieces thereon; and Fig. 2 is a perspective view showing one of the animal pieces and the marble used for knocking over these pieces or detaching them from the board.

Referring to these drawings, 10 designates the board which may be of any desired size, this board 10 being formed to provide a field 11, and an alley or runway 12. The board is mounted upon legs or in any other suitable manner and is rounded at its upper end and is provided at its upper end and sides with a raised wall 13.

Disposed on the space 11 and arranged at any suitable intervals are pairs of supporting members 14 which may be formed of metal and which are so formed as to provide laterally projecting flanges 15 attachable by screws or in any other suitable manner to the surface of the board and provide outwardly extending ears 16 which are perforated.

Adapted to be engaged with these ears by means which will be later described are the figures 17 of animals. Each of these figures has attached thereto divergent wires or other like supports designated 18, these wires extending downward in divergent relation and being angularly bent at their ends so as to be inserted loosely into the perforations 19 of the ears 16. Preferably I use the fifty figures designed to indicate animals and preferably these figures will be arranged in the manner indicated in rows transversely and longitudinally of the board.

I do not wish to be limited to any particular character of animals but I propose to have these figures formed to simulate lions, tigers, horses, elephants, zebras, giraffes, etc. There is no need, of course, of enumerating the various animals but they will be representative of both the wild and the domestic animals.

The piece used for playing this game is in the form of a marble or ball 20 which is propelled along the alley-way 12 or projected toward the upper end of the game board by means of a cue 21. A marble is projected against the end of the board and rebounds toward the foot end of the board in its course knocking over one or more of the animal figures which may be in its path. These figures have each a mounting number proportionate to the size or value of the animal and by means of these figures the game is scored. Preferably the lower end of the board is formed to provide a box 22 wherein the marble may drop after it has described its course.

It is obvious that two or more may play this game and that it will be very entertaining and instructive. While I have illustrated a particular means for supporting the animal-like figure in upright position upon the board yet it is obvious that other means may be provided than that illustrated. It is obvious also that the arrangement of the board may be varied and that other means for projecting the marble may be provided.

I claim:—

1. A game apparatus of the character described comprising a board having a side wall, a plurality of supporting members mounted upon the board and each of said supporting members having an upwardly extending, perforated portion, said perforated portion extending transversely to the length of the board, figures adapted to be disposed on said board and having supporting wires angularly bent at their ends for insertion in the perforations of the supporting members and being detachable from the supporting members, and a ball adapted to be projected against said figures.

2. A game apparatus of the character described comprising a board having a longitudinally extending alley at one side and a field to one side of said alley, the field being provided with a plurality of upwardly extending perforated members, animal figures adapted to be disposed in said field, each of said figures having divergently supported wires angularly bent at their ends for insertion in the perforations of the supporting members, and a ball adapted to be projected from the alley against said figures.

3. A game apparatus of the character described comprising a board having an outer wall, a longitudinally extending alley at one side of the board, a playing field disposed between the alley and the other side edge of the board and having thereon a plurality of upstanding perforated members, and animal figures each having a support attached thereto, angularly bent at its end for insertion into the perforation of the corresponding supporting member, a playing piece comprising a ball adapted to be projected from the alley against the side wall of the board and caused to rebound through said field, the board being provided at the lower end of the field with a receptacle into which said playing piece may drop.

In testimony whereof I hereunto affix my signature in the presence of two witnesses.

KUN SUNG CHUNG.

Witnesses:
HERBERT LAM,
P. H. BURNETT.

Copies of this patent may be obtained for five cents each, by addressing the "Commissioner of Patents, Washington, D. C."